Patented Sept. 11, 1928.

1,683,967

UNITED STATES PATENT OFFICE.

WOLCOTT C. FOSTER, OF RUTHERFORD, NEW JERSEY, AND ARTHUR S. GARRETT, OF DREXEL HILL, PENNSYLVANIA.

METHOD OF INCREASING THE EFFICIENCY OF ZEOLITES IN THE TREATMENT OF WATER.

No Drawing.   Application filed January 17, 1924.   Serial No. 686,934.

Our invention relates to zeolites and particularly to the use of zeolites with raw waters low in alkalinity or acid with free $CO_2$.

Our main purpose is to provide a way of greatly reducing the deterioration of the zeolite with use in such solutions and thereby materially to increase the length of each run and the number of times the zeolite may be effectively regenerated and used over and over.

A further purpose is to give the raw water a minimum alkalinity before passing it through the beds of zeolite, the degree of alkalinity being preferably sufficient to neutralize any acidity, as from free $CO_2$, and further sufficient to maintain the total alkalinity in solution in the raw water to or above a minimum value below which the zeolite deteriorates.

Further purposes will appear in the specification and in the claims.

We have found in practice that the total content of replaceable sodium oxide in the zeolite may be varied and to a certain extent controlled by alkalinity, a zeolite normally tending to take up sodium oxide from solutions strongly alkaline and to give off sodium oxide into solutions of very low alkalinity and that the zeolite deterioration is incident to the tendency to give off sodium oxide, a tendency preventable by increasing the alkalinity.

Thus in a solution of very low alkalinity we have found that there is a distinct tendency for sodium oxide from the zeolite to pass into the solution. This is true whenever the alkalinity of the solution is below a certain minimum value. This is of course intensified if instead of merely low alkalinity the solution be rendered actually acid by the presence of free $CO_2$. If the alkalinity be increased or if the acidity be neutralized and the solution be then made alkaline sufficiently, equilibrium is established and wasting of the $Na_2O$ no longer takes place.

Where there is insufficient alkalinity and consequent wastage of $Na_2O$ from the zeolite the remaining zeolite is relatively high in silica and low in $Na_2O$. We have found this resultant zeolite to be inferior for softening purposes and that the inferiority is more noticeable the less the amount of $Na_2O$ present.

It is our purpose to maintain alkalinity of the solution treated at or above that which corresponds with this equilibrium value.

Zeolites are substances adapted to base-exchange. They are usually sodium or iron aluminate silicates and are used extensively for softening water for many domestic and technical purposes.

Water softening normally comprises replacing the undesired bases of lime, magnesia, etc., in the water by an alkali base, usually sodium from the zeolite. In the zeolite process the exchange of base takes place in a filter bed of zeolite, loosely bound sodium base of the zeolite filter being exchanged for the undesired bases of the raw water. As the process continues the available base of the zeolite is gradually used up by replacement and the bed loses its effectiveness. After the effectiveness has been reduced to any desired limit the bed is cut out and is regenerated by washing in strong salt solution.

Prior to our invention the process with some waters has been handicapped by wasting and disintegration of the zeolite filter which has lost a considerable portion of its available sodium content without replacement by the hardness bases of the raw water. In this wasting process the zeolite has been permanently injured as a water softener, some of its sodium content passing to solution and the remainder, after the loss of the sodium, losses its hard character and is less suited to base-exchanging and therefore less adapted to water softening and to regeneration.

We have found that this wasting has been incident to the treatment of waters low in alkalinity and to waters containing free $CO_2$, and that the wasting may in either case be prevented or controlled by the addition of an alkaline base to the raw water. Sodium carbonate and caustic soda give good results.

Our invention lessens disintegration and sludging of the zeolite and (incident to a direct loss of sodium content from the zeolite into the water) a loss of its zeolitic characteristic of base-exchange, the characteristic which adapts it to water softening and to regeneration.

We have found that where a zeolite bed is fed with water of constitution of the zeolite strongly alkaline the sodium content of the zeolite relatively increases possibly with corresponding decrease in the water content; and that where it is fed with water containing little or no alkalinity in solution there is a decrease in the sodium exchange content, probably with a corresponding initial increase in the amount of water accompanied by wasting of the bed. We have found that there is no material tendency for a bed to lose its sodium exchange power with incidental wasting into the water if the alkalinity of the water is equal to or greater than a fairly low value readily determined by experiment, a value that is a function of the zeolite used.

An obvious advantage of our invention further than stopping wasting of the zeolite is the lengthened life of the beds and the increase in the quantity of water that may be cared for by a given bed before it has to be cut out for regeneration.

In order to facilitate the claiming of our invention and to avoid the necessity for referring to waters low in alkalinity and having acidity in each claim, we shall use the expression "low in alkalinity" in the claims to refer not only to those waters which are alkaline, though having low alkalinity, but to neutral waters and waters rendered acid by free $CO_2$ as these are obviously "low in alkalinity."

In view of our invention and disclosure, modification and variation in detail to suit individual whim or particular need will doubtless become evident to others skilled in the art and we claim all such broadly in so far as they fall within the reasonable spirit and scope of our invention.

Having thus described our invention, what we claim as new and desire to secure by Letters Patent is:—

1. In water softening, the process of treating raw waters having low initial alkalinity which consists in treating the raw water with a salt which is alkaline in solution until a predetermined standard of alkalinity is reached and in subsequently filtering it through zeolite while the water still has increased alkalinity.

2. In using zeolites in water softening, the process of protecting the zeolite from wasting when used in waters of low alkalinity which consists in adding to the initial alkalinity and in subsequently passing it through the zeolite while it possesses additional alkalinity.

3. In using zeolites in water softening, the process of protecting the zeolite from wasting when used in waters of low alkalinity which consists in continuously adding to the initial alkalinity by a salt of an alkali metal which is alkaline in solution and in subsequently passing it through the zeolite while it possesses added alkalinity.

4. The process of protecting zeolites in the treatment of waters having low alkalinity which consists in increasing the alkalinity to or above a predetermined standard found for a given zeolite and in subsequently passing it through the zeolite while it possesses increased alkalinity.

5. The process of protecting zeolite in the filtration through it of waters having a low alkalinity which consists in increasing the alkalinity until phase equilibrium has been reached between the water and the zeolite with respect to the total metallic oxide equivalent in the zeolite.

WOLCOTT C. FOSTER.
ARTHUR S. GARRETT.